US010397995B2

(12) United States Patent
Kontani et al.

(10) Patent No.: US 10,397,995 B2
(45) Date of Patent: Aug. 27, 2019

(54) INPUT DEVICE

(71) Applicant: Panasonic Intellectual Property Management Co., Ltd., Osaka (JP)

(72) Inventors: Masaki Kontani, Osaka (JP); Takeshi Masutani, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/081,367

(22) PCT Filed: Nov. 16, 2016

(86) PCT No.: PCT/JP2016/004897
§ 371 (c)(1),
(2) Date: Aug. 30, 2018

(87) PCT Pub. No.: WO2017/154055
PCT Pub. Date: Sep. 14, 2017

(65) Prior Publication Data
US 2019/0082506 A1    Mar. 14, 2019

(30) Foreign Application Priority Data
Mar. 9, 2016   (JP) .................................. 2016-046313

(51) Int. Cl.
*H05B 33/08*        (2006.01)
*H01H 25/00*        (2006.01)
(Continued)

(52) U.S. Cl.
CPC .......... *H05B 33/083* (2013.01); *G02B 6/0031* (2013.01); *H01H 25/00* (2013.01);
(Continued)

(58) Field of Classification Search
CPC .............. H05B 33/083; H05B 33/0842; G02B 6/0031; H01H 25/00; H01H 25/04; H01H 89/00
(Continued)

(56) References Cited

U.S. PATENT DOCUMENTS

| 2001/0049893 | A1 | 12/2001 | Maas et al. |
| 2003/0046842 | A1 | 3/2003 | Maas et al. |

(Continued)

FOREIGN PATENT DOCUMENTS

| JP | 2003-519810 | 6/2003 |
| JP | 2011-180430 | 9/2011 |
| JP | 2013-254597 | 12/2013 |

OTHER PUBLICATIONS

International Search Report of PCT application No. PCT/JP2016/004897 dated Dec. 13, 2016.

*Primary Examiner* — Don P Le
(74) *Attorney, Agent, or Firm* — Greenblum & Bernstein, P.L.C.

(57) ABSTRACT

An input device includes a switch, light sources, and a light guide body. The switch is configured to switch between ON and OFF by being pressed. The light sources include a first light source and a second light source disposed at a position different from a position of the first light source. The light guide body guides a light emitted from the light sources in an opposite direction opposite from a pressing direction of the switch. The light guide body includes an output section, a first light guide leg section, and a second light guide leg section. The output section outputs the light emitted from the light sources in the opposite direction. The first light guide leg section is connected to the output section and guides the first light emitted by the first light source to the output section. The second light guide leg section is connected to the output section and guides the second light emitted by the second light source to output section. The output section
(Continued)

includes a first design configured to emit light by reflecting the first light in the opposite direction and a second design configured to emit light by reflecting the second light in the opposite direction.

11 Claims, 12 Drawing Sheets

(51) Int. Cl.
*F21V 8/00* (2006.01)
*H01H 25/04* (2006.01)
*H01H 89/00* (2006.01)
(52) U.S. Cl.
CPC ......... *H05B 33/0842* (2013.01); *H01H 25/04* (2013.01); *H01H 89/00* (2013.01)
(58) Field of Classification Search
USPC ........................................................ 315/193
See application file for complete search history.

(56) References Cited

U.S. PATENT DOCUMENTS

| | | | |
|---|---|---|---|
| 2014/0364694 A1* | 12/2014 | Avron | A61B 1/00105 600/164 |
| 2015/0062098 A1 | 3/2015 | Sakai | |
| 2016/0138916 A1* | 5/2016 | Neitzell | G01C 9/36 33/381 |
| 2018/0111546 A1* | 4/2018 | Salter | B60Q 3/76 |
| 2019/0065800 A1* | 2/2019 | Nagata | G06K 7/10732 |

* cited by examiner

INPUT DEVICE

CROSS-REFERENCE TO RELATED APPLICATIONS

This application is a U.S. national stage application of the PCT International Application No. PCT/JP2016/004897 filed on Nov. 16, 2016, which claims the benefit of foreign priority of Japanese patent application No. 2016-046313 filed on Mar. 9, 2016, the contents all of which are incorporated herein by reference.

TECHNICAL FIELD

The present disclosure relates to an input device.

BACKGROUND ART

Conventional known light display input devices are configured to display a display design on a display operating unit of a switch knob by guiding a light emitted by a light source (see PTL 1).

CITATION LIST

Patent Literature

PTL 1: Unexamined Japanese Patent Publication No. 2013-254597

SUMMARY OF THE INVENTION

An input device according to an aspect of the present disclosure includes a switch, light sources, and a light guide body. The switch is configured to switch between ON and OFF by being pressed. The light sources include a first light source and a second light source disposed at a position different from a position of the first light source. The light guide body guides a light emitted from the light sources in an opposite direction opposite from a pressing direction of the switch. The light guide body includes an output section, a first light guide leg section, and a second light guide leg section. The output section is disposed on an opposite side from the switch and configured to output the lights emitted from the light sources in the opposite direction. The first light guide leg section is connected to the output section and guides the first light emitted by the first light source to the output section. The second light guide leg section is connected to the output section and guides the second light emitted by the second light source to output section. The output section includes a first design configured to emit light by reflecting the first light in the opposite direction and a second design configured to emit light by reflecting the second light in the opposite direction.

The input device of the present disclosure is capable of selectively displaying two designs.

DESCRIPTION OF EMBODIMENT

Figure 1:
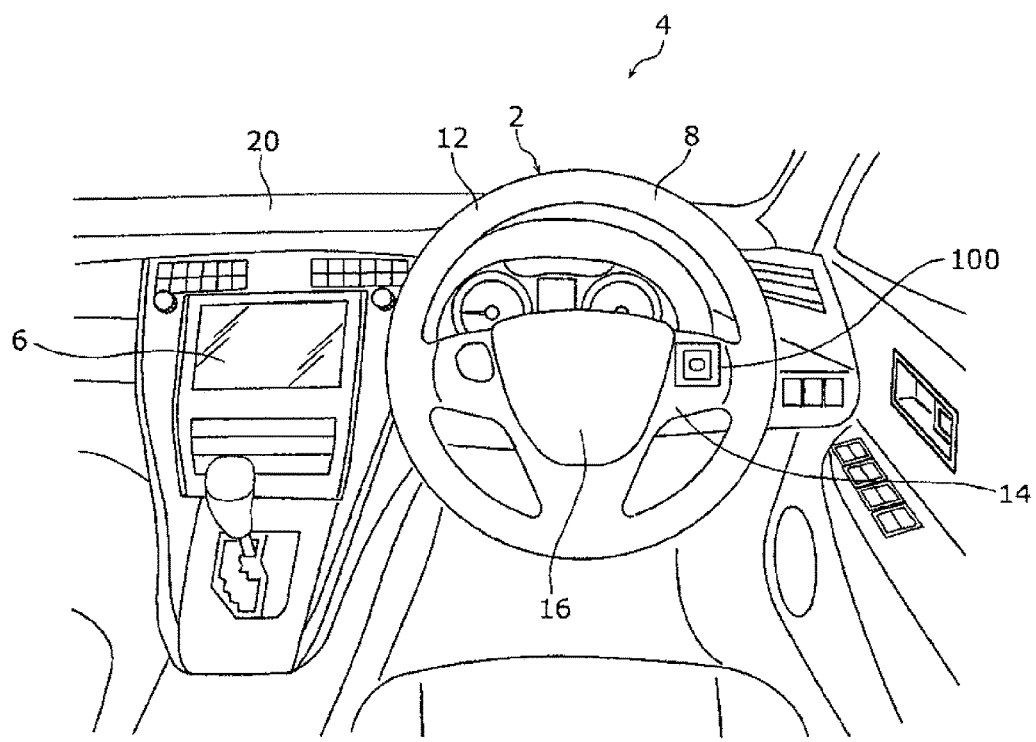
FIG. 1 is a view illustrating an example of an interior of a vehicle disposed with a steering input device according to an exemplary embodiment.

Prior to description of exemplary embodiments of the present disclosure, problems of conventional devices will be briefly described. Selectively displaying one of two designs having different shapes on a surface of a portion to be operated for switching is desired. However, one of two designs cannot be selectively displayed according to the technology disclosed in PTL 1.

Accordingly, the present disclosure provides an input device enabling selective display of two designs.

An input device according to a first aspect of the present disclosure includes: a switch configured to switch a state between ON and OFF by being pressed; light sources including a first light source and a second light source disposed at a position different from a position of the first light source; and a light guide body configured to guide light emitted from the light sources in the opposite direction from the pressing direction of the switch. The light guide body includes an output section provided on the opposite side from the switch and configured to emit lights emitted from the light sources in the opposite direction; a first light guide leg section connected to the output section and configured to guide a first light emitted from the first light source to the output section; and a second light guide leg section connected to the output section and configured to guide a second light emitted by the second light source to the output section. The output section includes a first design configured to emit light by reflecting the first light in the opposite direction and a second design configured to emit light by reflecting the second light in the opposite direction.

In this configuration, as for the first design and the second design configured to emit lights by reflecting lights, the first light guide leg section configured to guide light to the first design and first light source configured to emit light to the first light guide leg section are provided for the first design, and the second light guide leg section configured to guide light to the second design and the second light source configured to emit light to the second light guide leg section are provided for the second design. Accordingly, by selectively causing either one of the first light source and the second light source to emit light, two designs, that is, the first design and the second design may be selectively displayed.

A first direction corresponding to a direction of entry of the first light into the first design and a second direction corresponding to a direction of entry of the second light into the second design may intersect each other.

In this configuration, as the first direction and the second direction intersect with each other, such an event that the first light is reflected to the second design or the second light is reflected to the first design may be reduced. In other words, any display of unintended design due to reflection of unsupported light may be reduced.

The output section may include a first reflecting section configured to reflect the first light guided by the first light guide leg section toward the first design and a second reflecting section configured to reflect the second light guided by the second light guide leg section toward the second design.

In this configuration, the first light guided to the output section may be reflected by the first reflecting section and then guided to the first design, and the second light guided to the output section may be reflected by the second reflecting section first and then guided to the second design. Therefore, a width of output section 131 from positions of entry of the lights from the light sources to the respective designs may easily be reduced. In other words, even the output section has the compact configuration, the first direction and the second direction may be intersected, and thus any display of unintended design due to reflection of unsupported light may be reduced.

The first reflecting section and the second reflecting section may be formed in an identical plane.

Accordingly, the first reflecting section and the second reflecting section may be used commonly, and thus a compact configuration of the output section is achieved.

The output section may be a flat panel-shaped portion, and the first light guide leg section and the second light guide leg section may be connected by portions bent at a predetermined angle with respect to the output section.

Therefore, even when the first light source and the second light source are mounted on a main surface of an identical substrate on one side, the first light and the second light may be guided to the output section easily.

At least parts of the first design and the second design may be formed to overlap each other.

Therefore, a compact configuration of the output section is achieved.

The first light guide leg section may include a first stepped surface intersecting a third direction corresponding to a direction of travel of the first light and facing the third direction, and the second light guide leg section may include a second stepped surface intersecting a fourth direction corresponding to a direction of travel of the second light and facing the fourth direction.

Therefore, the light emitted from the first light source and the second light source may be squeezed into lights that may be reflected substantially to the first design and the second design by the first stepped surface and the second stepped surface. Accordingly, entry of light not involved in display of the first design and the second design into the output section may be reduced, and display of other portion by being illuminated when one of the first design and second design is selectively displayed may be reduced as well.

The first light guide leg section may include a plurality of first stepped surfaces disposed at different positions in the third direction, and the second light guide leg section may include a plurality of second stepped surfaces disposed at different positions in the fourth direction.

Therefore, the light emitted from the first light source and the second light source may be effectively squeezed into lights that may be reflected substantially to the first design and the second design by the first stepped surfaces and the second stepped surfaces.

The first stepped surface and the second stepped surface may be colored in black.

Therefore, reflection of the first light and the second light from the first stepped surface and the second stepped surface may be reduced. Therefore, the light emitted from the first light source and the second light source may be effectively squeezed into lights that may be reflected substantially to the first design and the second design by the first stepped surface and the second stepped surface.

The surface area of the first stepped surface is smaller than a cross-sectional area of the first light guide leg section at a portion provided with the first stepped surface, and the surface area of the second stepped surface may be smaller than a cross-sectional area of the second light guide leg section at a portion provided with the second stepped surface.

Therefore, the light emitted from the first light source and the second light source may be effectively squeezed into lights that may be reflected substantially to the first design and the second design by the first stepped surface and the second stepped surface.

The output section may include a third stepped surface disposed on an extension of the first direction corresponding to a direction of entry of the first light into the first design, intersecting the first direction, and facing in the first direction, and a fourth stepped surface disposed on an extension of the second direction corresponding to a direction of entry of the second light into the second design, intersecting the second direction, and facing the second direction.

Therefore, reflection of light entered the first design but not reflected by the first design in a direction different from first direction at an end of output section may be reduced. Likewise, reflection of light entered the second design but not reflected by the second design in a direction different from the second direction at an end of the output section may also be reduced. Accordingly, staying of light not involved in display of the first design and the second design in the output section may be reduced, and thus unintentional illumination and display of other portions when one of the first design and the second design is selectively displayed may be reduced.

The output section may include a plurality of third stepped surfaces disposed at different positions in a fifth direction and a plurality of fourth stepped surfaces disposed at different positions in the fifth position, and the plurality of third stepped surfaces and the plurality of fourth stepped surfaces may be arranged alternately in the fifth direction. The fifth direction intersects the first direction and the second direction.

In this configuration, since the plurality of third stepped surfaces and the plurality of fourth stepped surfaces are arranged in the same fifth direction, the plurality of third stepped surfaces and the plurality of fourth stepped surfaces may be arranged in a limited area of the output section. Consequently, staying of light not involved in display of the first design and the second design in the output section may be reduced more effectively, and thus unintentional illumination and display of other portions when one of the first design and the second design is selectively displayed may be reduced.

The third stepped surfaces and the fourth stepped surfaces may be colored in black.

Therefore, reflection of the first light and the second light from the third stepped surfaces and the fourth stepped surfaces may be reduced. Consequently, staying of light not involved in display of the first design and the second design in the output section may be reduced more effectively, and thus unintentional illumination and display of other portions when one of the first design and the second design is selectively displayed may be reduced.

The switch, the first light source, and the second light source may be mounted on an identical wire substrate.

Therefore, the switch, the first light source, and the second light source may be arranged in a simple configuration. The input device having a compact configuration is easily achieved.

The input device according to an aspect of the present disclosure will be described in detail with reference to the accompanying drawings below.

Note that the exemplary embodiment described below illustrates a specific example of the present disclosure. Numerical values, shapes, materials, structural elements, arrangement positions and connection modes of the structural elements, steps, order of the steps, and the like illustrated in the following exemplary embodiment are merely examples, and therefore are not intended to limit the present disclosure. Furthermore, among the constituent elements in the following exemplary embodiments, constituent elements not recited in the independent claim indicating the broadest concept are described as optional constituent elements.

Exemplary Embodiment 1-1. Configuration of Steering Input Device

Figure 2:
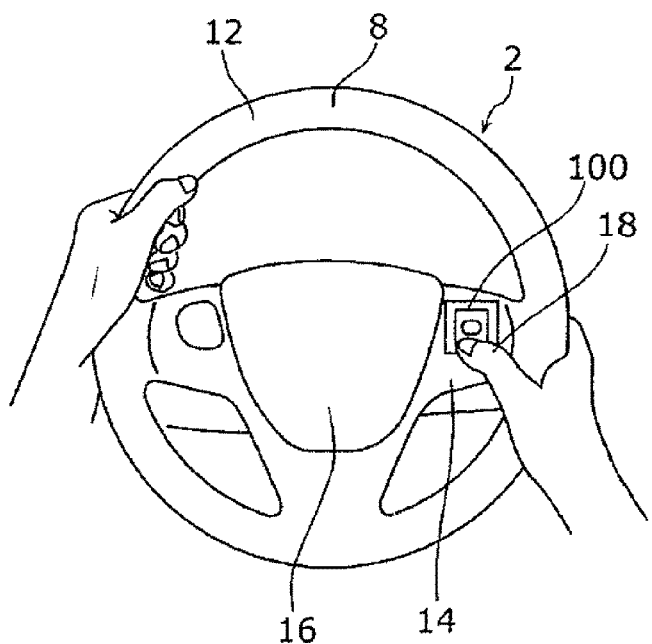
FIG. 2 is a view illustrating a usage example of the steering input device according to the exemplary embodiment.

With reference first to FIG. 1 and FIG. 2, a configuration of steering input device 2 according to the exemplary embodiment will be described. FIG. 1 is a view illustrating an example of an interior of a vehicle disposed with steering input device 2 according to an exemplary embodiment. FIG. 2 is a view illustrating a usage example of steering input device 2 according to the exemplary embodiment.

Steering input device 2 and an on-vehicle equipment 6 are mounted in an interior of automobile 4 (an example of vehicle) illustrated in FIG. 1. The steering input device 2 according to the exemplary embodiment includes steering wheel 8 and input device 100.

Steering wheel 8 is used for steering automobile 4. Steering wheel 8 includes rim 12 having a ring shape, spoke 14 formed integrally with an inner peripheral surface of rim 12 and having a substantially T shape; and horn switch cover 16 configured to cover a horn switch (not illustrated) disposed at the center of spoke 14.

Input device 100 is used for operating on-vehicle equipment 6, and is disposed, for example, on spoke 14 of steering wheel 8. As illustrated in FIG. 2, a user, that is, a driver may perform input via input device 100 with finger 18 of the right hand (an example of an operating object) gripping rim 12 and operate on-vehicle equipment 6. A configuration of input device 100 will be described in detail later.

On-vehicle equipment 6 may be, for example, an audio device configured to reproduce optical disks such as a compact disks. On-vehicle equipment 6 is disposed in, for example, dashboard 20. A configuration of on-vehicle equipment 6 will be described in detail later.

1-2. Configuration of Input Device

Figure 3:
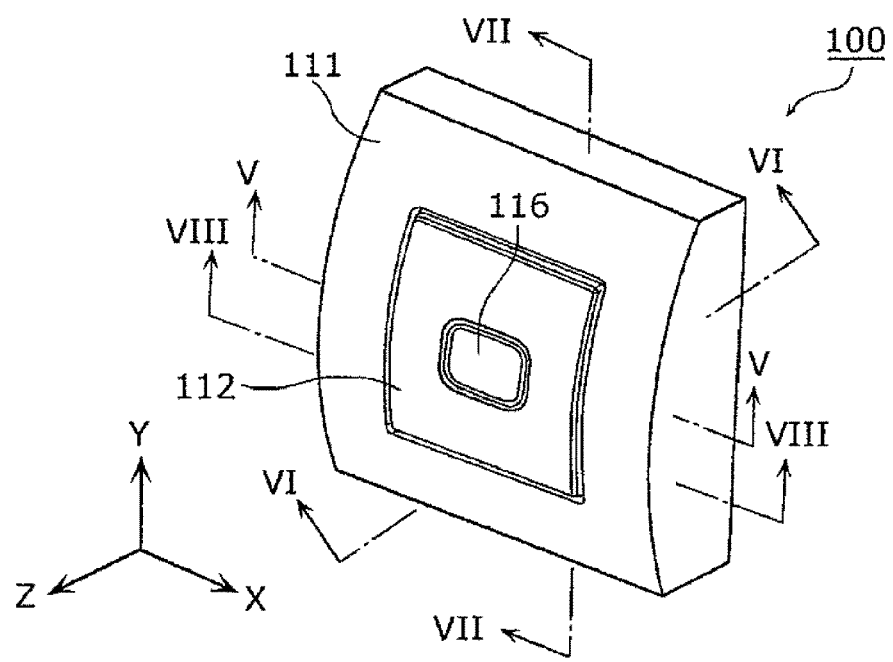
FIG. 3 is an appearance perspective view illustrating an input device according to the exemplary embodiment.
Figure 4:
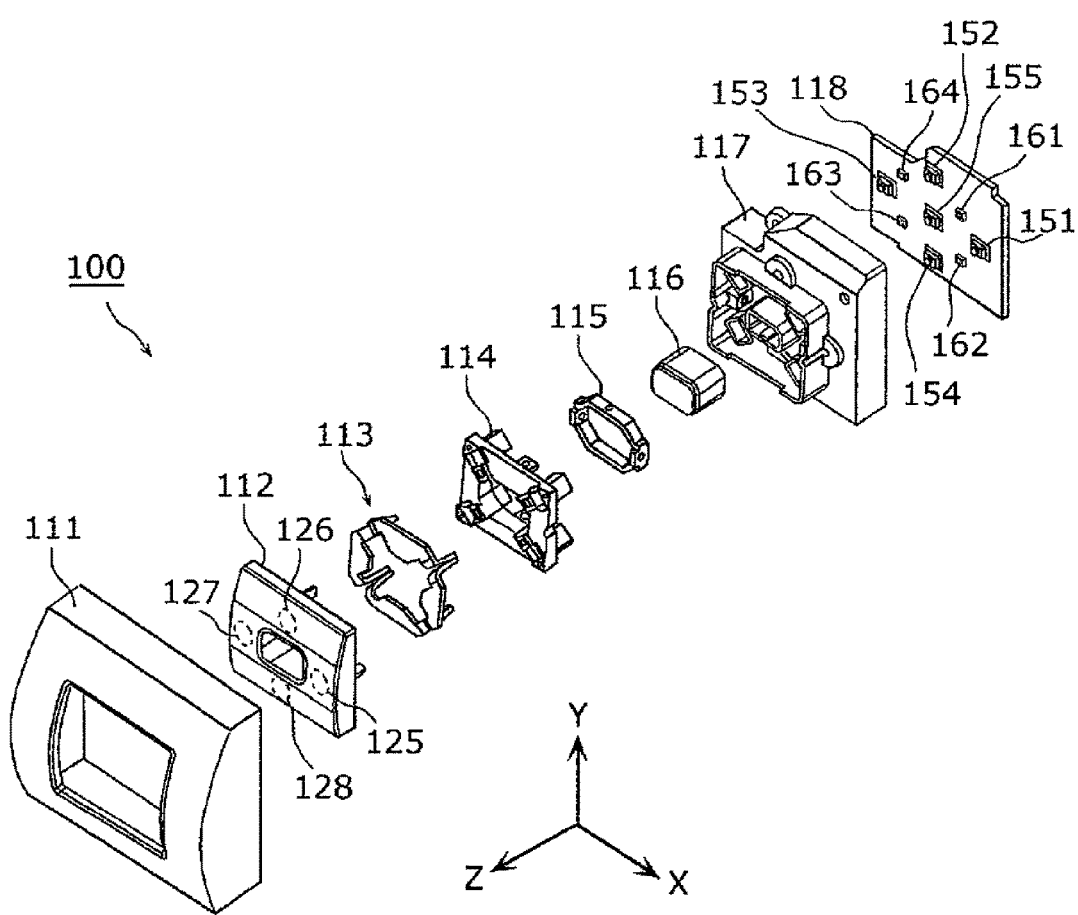
FIG. 4 is an exploded perspective view illustrating the input device according to the exemplary embodiment.
Figure 5:
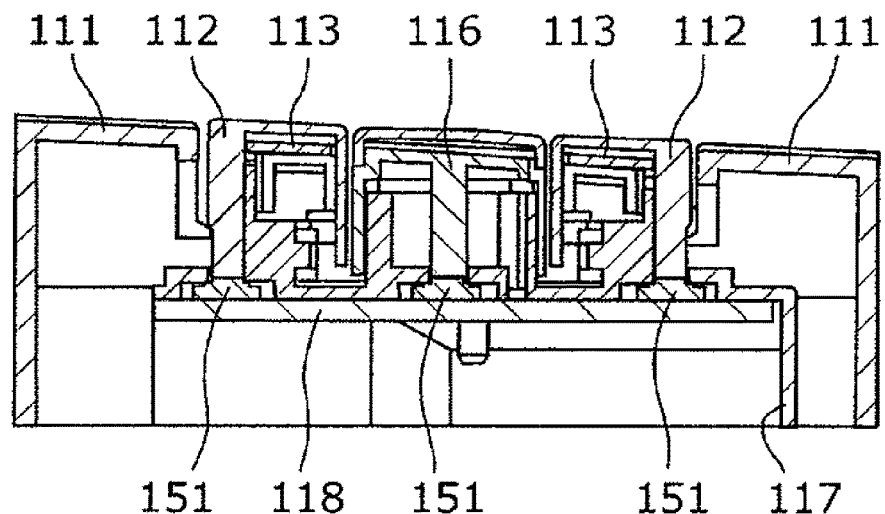
FIG. 5 is a cross-sectional view taken along line V-V in FIG. 3.
Figure 6:
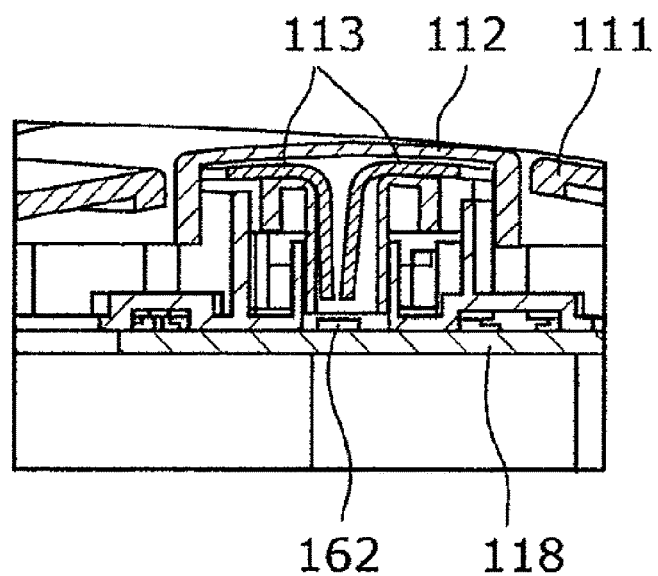
FIG. 6 is a cross-sectional view taken along line VI-VI in FIG. 3.
Figure 7:
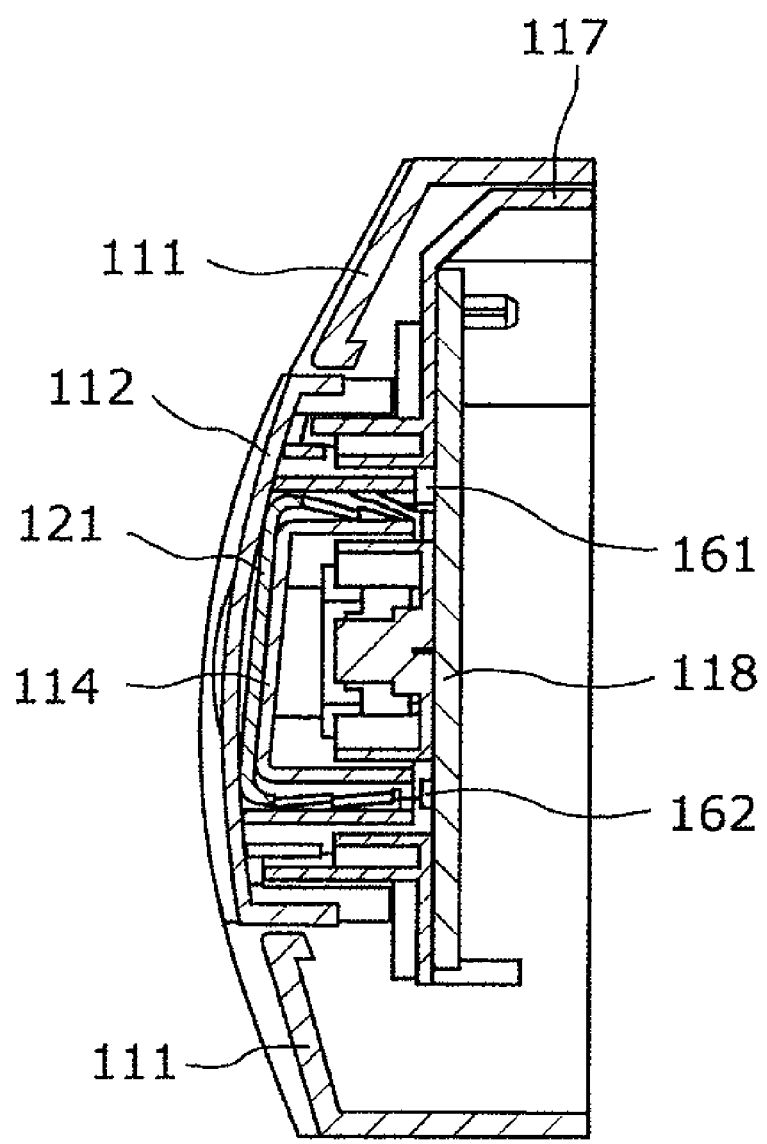
FIG. 7 is a cross-sectional view taken along line VII-VII in FIG. 3.
Figure 8:
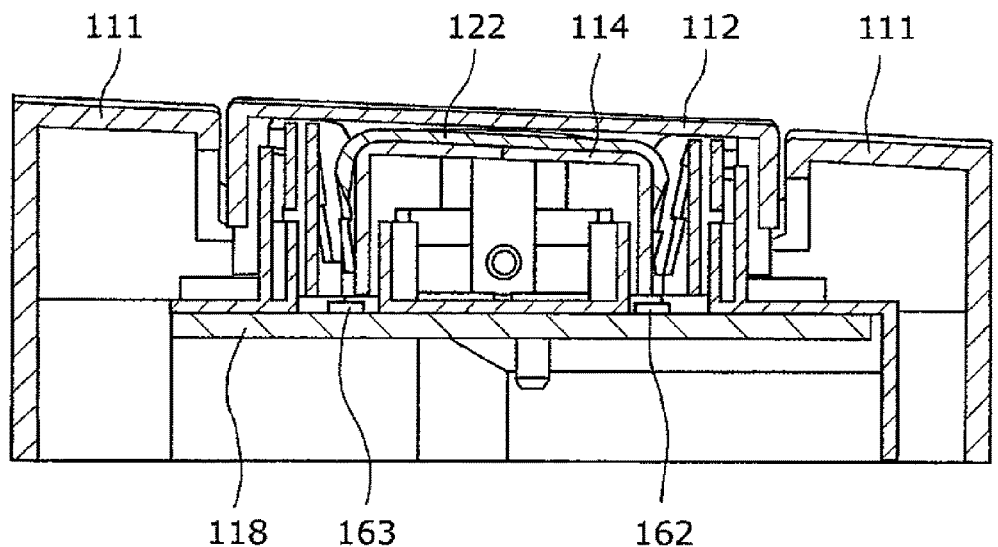
FIG. 8 is a cross-sectional view taken along line VIII-VIII in FIG. 3.

With reference next to FIG. 3 and FIG. 4, a configuration of input device 100 according to the exemplary embodiment will be described. FIG. 3 is an appearance perspective view illustrating input device 100 according to the exemplary embodiment. FIG. 4 is an exploded perspective view illustrating input device 100 according to the exemplary embodiment. FIG. 5 is a cross-sectional view taken along line V-V in FIG. 3. FIG. 6 is a cross-sectional view taken along line VI-VI in FIG. 3. FIG. 7 is a sectional view taken along line VII-VII in FIG. 3. FIG. 8 is a cross-sectional view taken along line VIII-VIII in FIG. 3.

As illustrated in FIG. 3 to FIG. 8, input device 100 according to the exemplary embodiment includes housing 111, first operating unit 112, light guide body 113, first supporting unit 114, shaft body 115, second operating unit 116, second supporting unit 117, and substrate 118.

Housing 111 is a member configured to cover a front side (a positive side in Z-axis direction) of input device 100.

First operating unit 112 is a member configured to selectively pressing any one of four switches 151 mounted on substrate 118 provided on a back side (negative side in Z-axis direction) by being operated by a driver. First operating unit 112 is pivotably and biaxially supported by first supporting unit 114, shaft body 115, and second supporting unit 117. Specifically, first operating unit 112 is supported pivotably about an axis in directions parallel to X-axis direction and Y-axis direction.

For example, when a driver presses portion 125 of first operating unit 112 located on a positive side in X-axis direction, portion 125 pivots about a first axis parallel to Y-axis direction of shaft body 115, and presses switch 151 disposed at a position on substrate 118 corresponding to portion 125. Likewise, when a driver presses portion 126 of first operating unit 112 located on a positive side in Y-axis direction, first operating unit 112 causes portion 126 to pivot about a second axis parallel to X-axis direction of shaft body 115 and to press switch 152 disposed at a position on substrate 118 corresponding to portion 126. In the same manner, when portion 127 of first operating unit 112 located on a negative side in X-axis direction is pressed, portion 127 presses switch 153 disposed at a position corresponding to portion 127, and when portion 128 of first operating unit 112 located on negative side in Y-axis direction is pressed, portion 128 presses switch 154 disposed at a position corresponding to portion 128.

Light guide body 113 guides lights emitted from light sources 161 to 164 mounted on substrate 118 from switch 151 in an opposite direction opposite from a pressing direction of switch 151. Light guide body 113 may be formed of a transparent material such as acrylic resin, polycarbonate resin, and the like. Specific configuration of light guide body 113 will be described later.

First supporting unit 114 is a member for supporting first operating unit 112 and light guide body 113. First supporting unit 114 also supports shaft body 115 pivotably about the first axis.

Second supporting unit 117 is a member for supporting second operating unit 116. Second supporting unit 117 supports shaft body 115 pivotably about the second axis.

First supporting unit 114 and second supporting unit 117 are disposed out of interference with each other. Therefore, first supporting unit 114 is allowed to pivot with respect to second supporting unit 117 biaxially via shaft body 115. Accordingly, first operating unit 112 is allowed to pivot biaxially.

Second operating unit 116 is supported slidably with respect to second supporting unit 117 in Z-axis direction. When second operating unit 116 is pressed toward the negative side in Z-axis direction, second operating unit 116 presses switch 155 disposed at a center of substrate 118.

First supporting unit 114, shaft body 115, second operating unit 116, and second supporting unit 117 are formed of, for example, an opaque resin.

Substrate 118 is a wire substrate including a plurality of switches 151 to 155 and a plurality of light sources 161 to 164 as light sources. The plurality of switches 151 to 155 and the plurality of light sources 161 to 164 are mounted on a main surface of substrate 118 on a front side (positive side in Z-axis direction). Therefore, the plurality of switches 151 to 155 and the plurality of light sources 161 to 164 may be arranged in a simple configuration.

The plurality of switches 151 to 155 are disposed at different positions with each other on the main surface of substrate 118. Likewise, the plurality of light sources 161 to 164 are disposed at different positions with each other on the main surface of substrate 118.

The plurality of switches 151 to 155 are switches configured to switch the state between ON and OFF by being pressed. Specifically, each of the plurality of switches 151 to 155 is a switch configured to switch the state between ON and OFF of a predetermined function by being pressed.

Each of the plurality of light sources 161 to 164 may be, for example, a Light Emitting Diode (LED).

First operating unit 112 is formed of a material having translucency, and may be formed of, for example, a resin. First operating unit 112 may be colored into a smoked color. Accordingly, when light sources 161 to 164 mounted on substrate 118 emit lights, lights emitted from first design 141 (see FIG. 9 and FIG. 10) and second design 142 (see FIG. 11 and FIG. 12) formed on light guide body 113 may be output to the positive side in Z-axis direction. In contrast, when light sources 161 to 164 do not emit lights, visibility of interior components to a driver may be reduced.

1-3. Configuration of Light Guide Body

Figure 9:
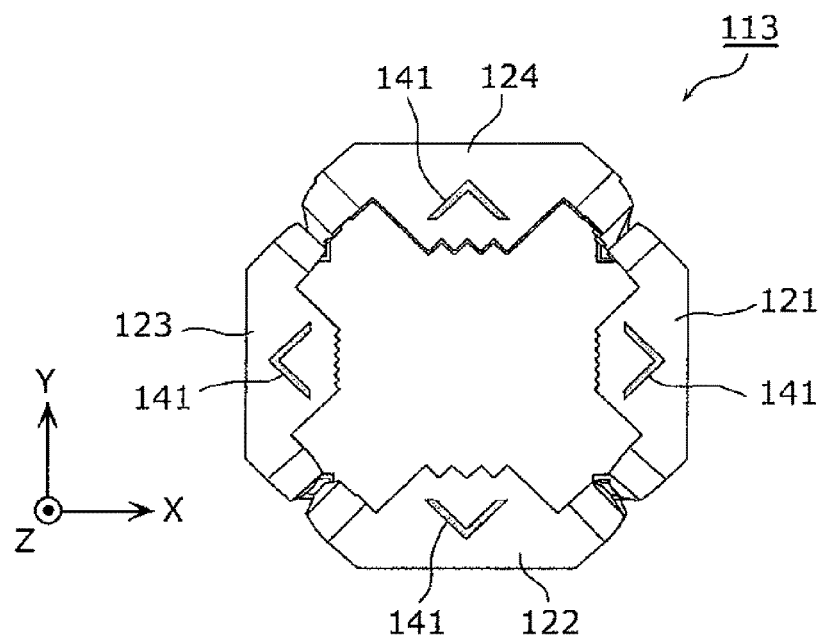
FIG. 9 is a front elevation of a light guide body with first designs displayed, viewed from a positive side in a Y-axis direction.
Figure 10:
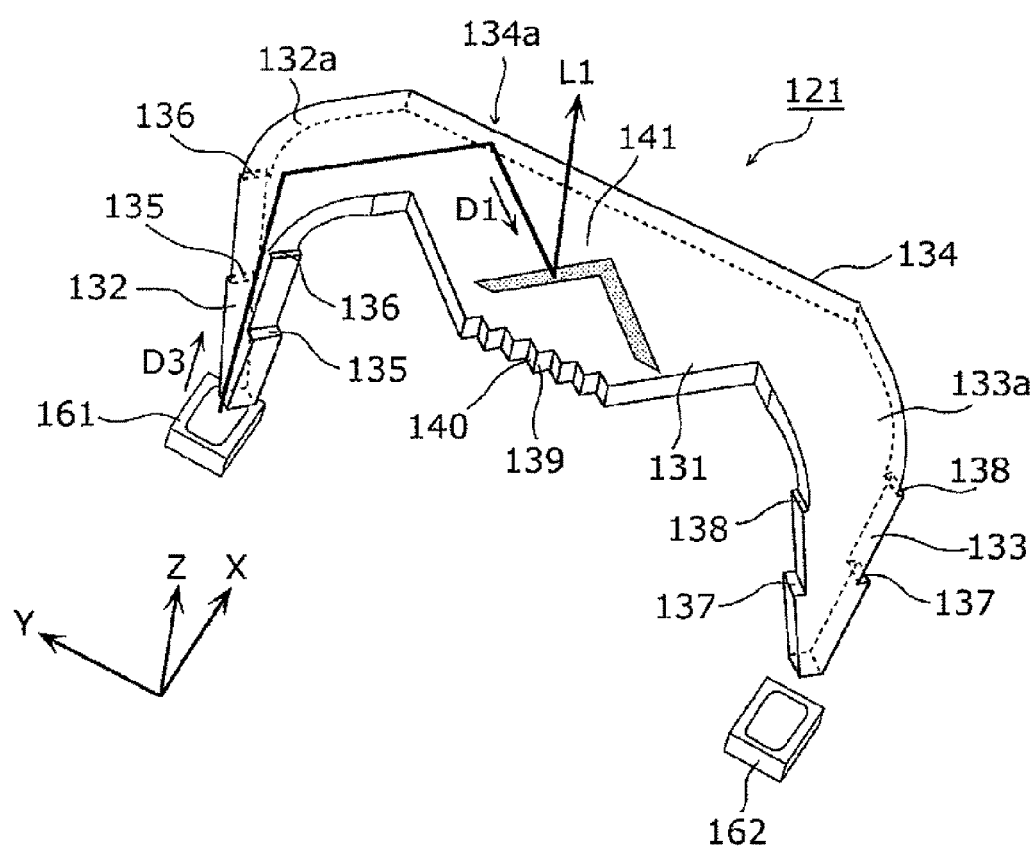
FIG. 10 is a perspective view illustrating a relationship between a first light guide body with the first design displayed and two light sources.
Figure 11:
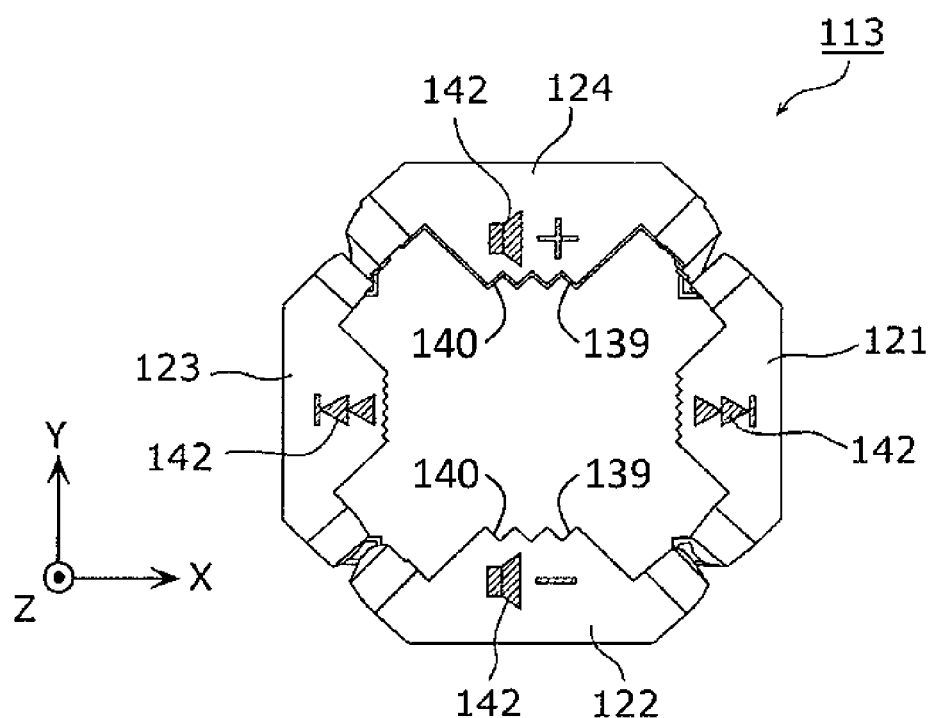
FIG. 11 is a front elevation of the light guide body with second designs displayed, viewed from the positive side in the Y-axis direction.
Figure 12:
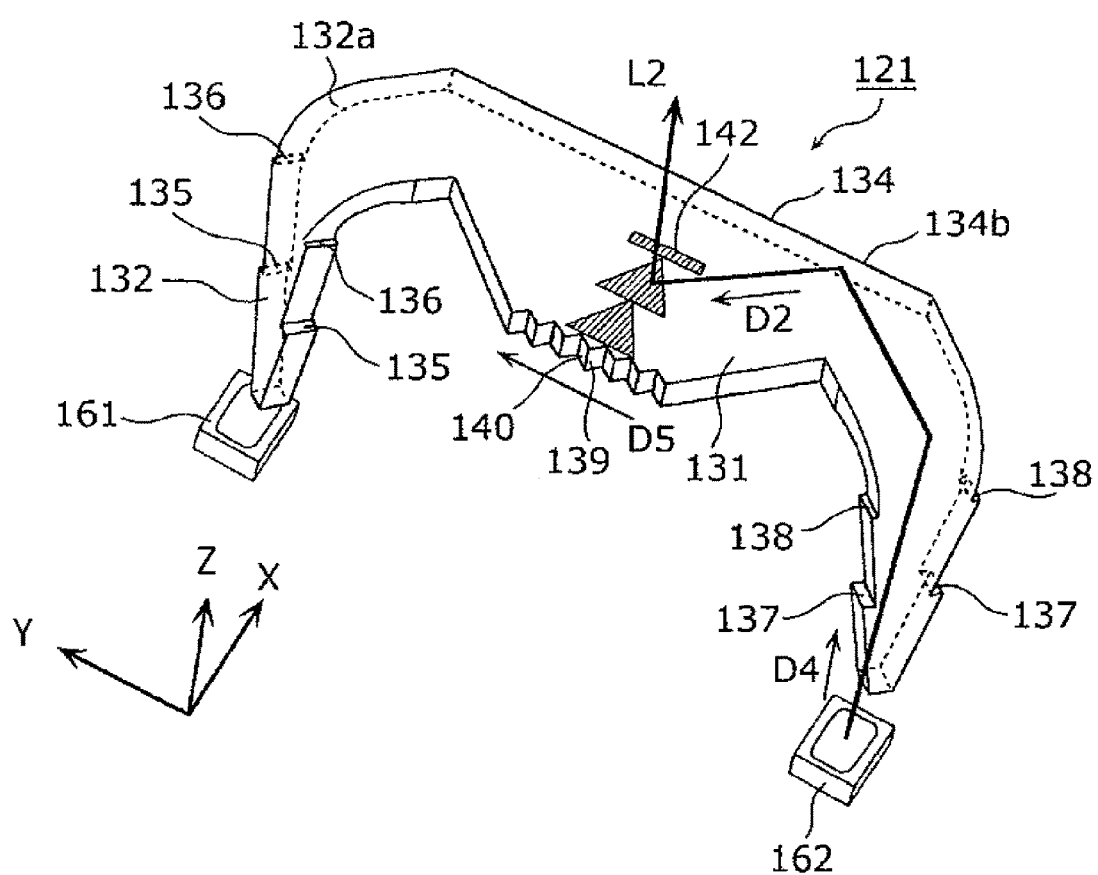
FIG. 12 is a perspective view illustrating a relationship between the first light guide body with the second design displayed and the two light sources.

With reference next to FIG. 9 and FIG. 10, a configuration of light guide body 113 according to the exemplary embodiment will be described. FIG. 9 is a front elevation illustrating a light guide body 113 when a first design 141 is displayed, viewed from a positive side in Z-axis direction. FIG. 10 is a perspective view illustrating a relationship between first light guide body 121 and two light sources 161, 162 when first design 141 is displayed. FIG. 11 is a front elevation illustrating a light guide body 113 when second design 142 is displayed, viewed from the positive side in Z-axis direction. FIG. 12 is a perspective view illustrating a relationship between first light guide body 121 and two light sources 161, 162 when second design 142 is displayed.

As illustrated in FIG. 9 and FIG. 11, light guide body 113 includes first light guide body 121, second light guide body 122, third light guide body 123, and fourth light guide body 124. First light guide body 121 is disposed on positive side in X-axis direction, second light guide body 122 is disposed on negative side in Y-axis direction, third light guide body 123 is disposed on negative side in X-axis direction, and fourth light guide body is disposed on positive side in Y-axis direction.

As illustrated in FIG. 9, first design 141 is formed on each of light guide bodies 121 to 124. First design 141 has a hook-like shape to indicate a direction of arrangement of each of light guide bodies 121 to 124. As illustrated in FIG. 11, second design 142 is formed on each of light guide bodies 121 to 124. Second design 142 has a different shape from first design 141. Second design 142 has a shape indicating, for example, jumping to next music, jumping to previous music, turning sound volume up or turning sound volume down. Note that first design 141 and second design 142 may have any shape as long as they have different shapes from each other.

With reference next to FIG. 10 and FIG. 12, the shape of first light guide body 121 will be described. As second light guide body 122, third light guide body 123, and fourth light guide body 124 have similar shape to first light guide body 121 except for a difference of at least one of first design 141 and second design 142, the description thereof is omitted.

As indicated in FIG. 10 and FIG. 12, first light guide body 121 includes output section 131, first light guide leg section 132, and second light guide leg section 133.

Figure 14:
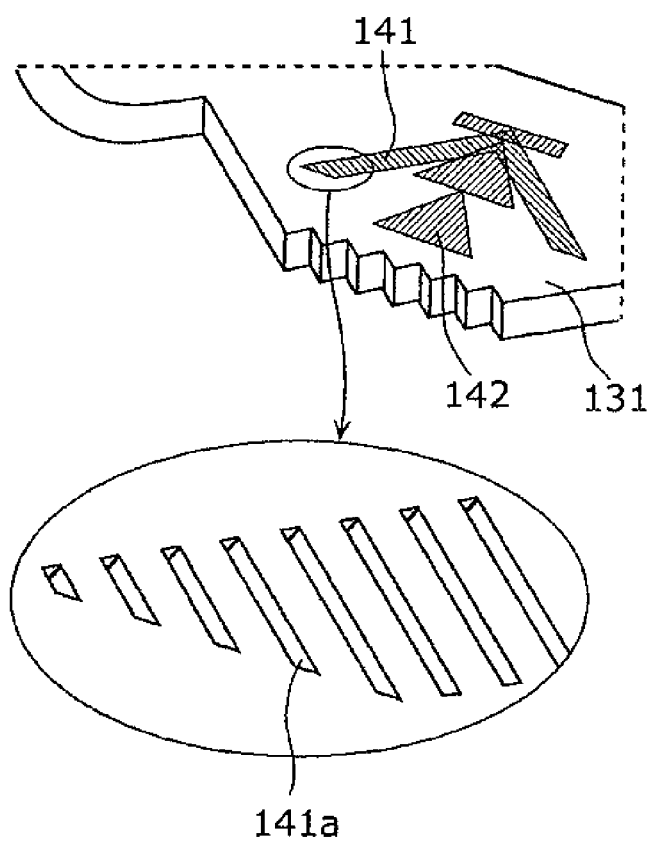
FIG. 14 is a partially enlarged drawing of the first design in the output section.

Output section 131 is provided on the opposite side (positive side in Z-axis direction) from switch 151 and emits light emitted from light source 161 or light source 162 toward the positive side in Z-axis direction. Output section 131 is a flat-plate shaped part, and is disposed in substantially parallel to X-Y plane. Output section 131 includes first design 141 and second design 142. First design 141 emits light by reflecting the first light emitted from the first light source corresponding to light source 161 to the positive side in Z-axis direction. Second design 142 emits light by reflecting the second light emitted from the second light source corresponding to light source 162 to the positive side in Z-axis direction. At least parts of first design 141 and second design 142 are formed to overlap with each other as illustrated in FIG. 14 as described later.

Output section 131 also includes first reflecting section 134a and second reflecting section 134b. First reflecting section 134a is a reflecting plane configured to reflect the first light guided by first light guide leg section 132 toward first design 141. Second reflecting section 134b is a reflecting plane configured to reflect the second light guided by second light guide leg section 133 toward second design 142. First reflecting section 134a and second reflecting section 134b are formed in identical plane 134. Note that plane 134 is an end surface parallel to Y-Z plane facing the positive side in X-axis direction of output section 131. Therefore, first reflecting section 134a and second reflecting section 134b may be commonly provided by identical plane 134 and thus a compact configuration of output section 131 is easily achieved.

In this configuration, the first light and the second light guided to output section 131 may be reflected once respectively from first reflecting section 134a and second reflecting section 134b and then guided to first design 141 and second design 142. This configuration easily achieves a reduction of a width of output section 131 from positions of entry of the respective lights emitted from light sources 161, 162 to respective designs 141, 142.

First light guide leg section 132 is connected to output section 131 and guides the first light emitted by the first light source corresponding to light source 161 to output section 131. Specifically, first light guide leg section 132 is a portion extending in substantially parallel to Z-axis direction from an end of output section 131 on positive side in Y-axis direction toward light source 161 via curved section 132a curved at a predetermined angle. In other words, first light guide leg section 132 is connected to output section 131 via curved section 132a.

Second light guide leg section 133 is connected to output section 131, and guides the second light emitted by the second light source corresponding to light source 162 to output section 131. Specifically, second light guide leg section 133 is a portion extending in substantially parallel to Z-axis direction from an end of output section 131 on negative side in Y-axis direction toward light source 162 via curved section 133a curved at a predetermined angle. In other words, second light guide leg section 133 is connected to output section 131 via curved section 133a.

As described above, each of light guide bodies 121 to 124 is disposed across two light sources of four light sources 161 to 164. In other words, each of the light guide bodies 121 to 124 is capable of either displaying first design 141 by the first light from the first light source or displaying second design 142 by the second light from the second light source by selectively illuminating lights from the first light source and the second light source out of four light sources 161 to 164.

In the exemplary embodiment, input device 100 is operated in a plurality of operation modes. For example, input device 100 is operated in two operation modes including a menu selection mode corresponding to the first operation mode and a music player mode corresponding to the second operation mode. Input device 100 may switch functions among functions preset for the plurality of switches 151 to 155 depending on the operation mode switched by predetermined switching means. Predetermined switching means may include various switching means such as ON and OFF of other switches, voice recognition, and gesture recognition.

In input device 100, functions for a plurality of allocated switches correspond one-to-one to functions emitted by pairs of the light sources depending on the operation mode. For example, in a first operation mode, the plurality of switches 151 to 155 function as a cross key for moving a selected menu item for selecting a menu and an execution key for setting the selected menu item. In the second operation mode, the plurality of switches 151 to 155 function as keys for, for example, jumping to next music, jumping to previous music, turning sound volume up, turning sound volume down, playing and stopping.

Accordingly, in the present exemplary embodiment, first design 141 is displayed in the first operation mode and second design 142 is displayed in the second operation mode by selectively illuminating one of the first light source and the second light source depending on the operation mode.

Specifically describing about the plurality of light sources 161 to 164, when one of two pairs of light sources disposed at diagonal corners of the plurality of light sources 161 to 164, that is, one pair of light sources 161, 163 out of the plurality of light sources 161 to 164 is lit, the other pair of light sources 162, 164 is turned off, while when the other pair of light sources 162, 164 is lit, the one pair of light sources 161, 163 is turned off. In other words, depending on whether the operation mode is the first operation mode or the second operation mode, the state of the light sources is selectively translated between a first state and a second state. In the first state, the one pair of light sources 161, 163 is lit and the other pair of light sources 162, 164 is turned off. In the second state, the other pair of light sources 162, 164 is lit and the one pair of light sources 161, 163 is turned off. In the exemplary embodiment, when the operation mode of the plurality of switches 151 to 155 is the first operation mode, the plurality of light sources 161 to 164 take the first state and illuminates first design 141. When the operation mode of the plurality of switches 151 to 155 is the second operation mode, the plurality of light sources 161 to 164 take the second state and displays second design 142.

Note that all of the plurality of light sources 161 to 164 may be turned off when the plurality of switches 151 to 155 are brought into OFF states by external switches, for example.

As described thus far, the first light from light source 161 travels through first light guide leg section 132 to the positive side in Z-axis direction (third direction D3), is reflected by curved section 132a and is simultaneously bent into a direction parallel to output section 131, and then enters output section 131. Likewise, the second light from light source 162 travels through second light guide leg section 133 to the positive side in Z-axis direction (fourth direction D4), is reflected by curved section 133a and is simultaneously bent into a direction parallel to output section 131, and then enters output section 131. In this manner, in the exemplary embodiment, first light guide leg section 132 and second light guide leg section 133 may be provided with a configuration described later for preventing or reducing stray light that does not contribute to display first design 141 and second design 142 before the first light or the second light enters output section 131.

Specifically, as illustrated in FIG. 10 and FIG. 12, first light guide leg section 132 includes first stepped surfaces 135, 136 intersecting third direction D3 corresponding to a direction of travel of the first light and facing third direction D3, a part of first stepped surfaces 135, 136 being opened. Likewise, second light guide leg section 133 includes second stepped surfaces 137, 138 intersecting fourth direction D4 corresponding to the direction of travel of the second light and facing fourth direction D4, a part of second stepped surfaces 137, 138 being opened. In other words, first stepped surfaces 135 and 136 and second stepped surfaces 137 and 138 face the positive side in Z-axis direction.

Therefore, the lights emitted from light source 161 corresponding to first light source and light source 162 corresponding to second light source may be squeezed into lights that may be reflected substantially to first design 141 and second design 142 by first stepped surfaces 135, 136 and second stepped surfaces 137, 138. Accordingly, entry of light not involved in display of first design 141 and second design 142 into output section 131 may be reduced and display of other portion by being illuminated when one of first design 141 and second design 142 is selectively displayed may be reduced.

Pairs of first stepped surfaces 135, 136 are formed on both sides of the route of the first light traveling in third direction D3. First stepped surfaces 135 and first stepped surfaces 136 are disposed at different positions in third direction D3. Likewise, pairs of second stepped surfaces 137, 138 are formed on both sides of the route of the second light traveling in fourth direction D4. Second stepped surfaces 137 and second stepped surfaces 138 are disposed at different positions in fourth direction D4. Therefore, the lights from light sources 161, 162 may be effectively squeezed to lights that may be reflected substantially to first design 141 and second design 142 at first stepped surfaces 135, 136 and second stepped surfaces 137, 138.

First stepped surfaces 135, 136 and second stepped surfaces 137, 138 may be colored in black. This coloring may reduce reflection of the first light and the second light by first stepped surfaces 135, 136 and second stepped surfaces 137, 138. Therefore, the lights emitted from light sources 161, 162 may be effectively squeezed into lights that may be reflected substantially to first design 141 and second design 142 by first stepped surfaces 135, 136 and second stepped surfaces 137, 138.

The surface area of each of first stepped surfaces 135 is preferably smaller than the cross-sectional area of a portion of first light guide leg section 132 at a position provided with first stepped surfaces 135. Likewise, the surface area of each of first stepped surfaces 136 is preferably smaller than the cross-sectional area of first light guide leg section 132 at a position provided with first stepped surfaces 136. Likewise, the surface area of each of second stepped surfaces 137 is preferably smaller than the cross-sectional area of second light guide leg section 133 at a position provided with second stepped surfaces 137. Likewise, the surface area of each of second stepped surfaces 138 is preferably smaller than the cross-sectional area of second light guide leg section 133 at a position provided with second stepped surfaces 138.

As used herein the term "surface area of first stepped surfaces 135" is intended to include a total sum of surface areas of a plurality of areas when the first stepped surface includes a plurality of areas. As used herein the term "cross-sectional area of a portion of first light guide leg section 132 at a position provided with first stepped surfaces 135" is intended to include a surface area of a cross section of first light guide leg section 132 taken along a plane orthogonal to Z-axis direction at a position provided with first stepped surfaces 135 in Z-axis direction. The same applies to first stepped surfaces 136 and to each of second stepped surfaces 137, 138.

Figure 13:
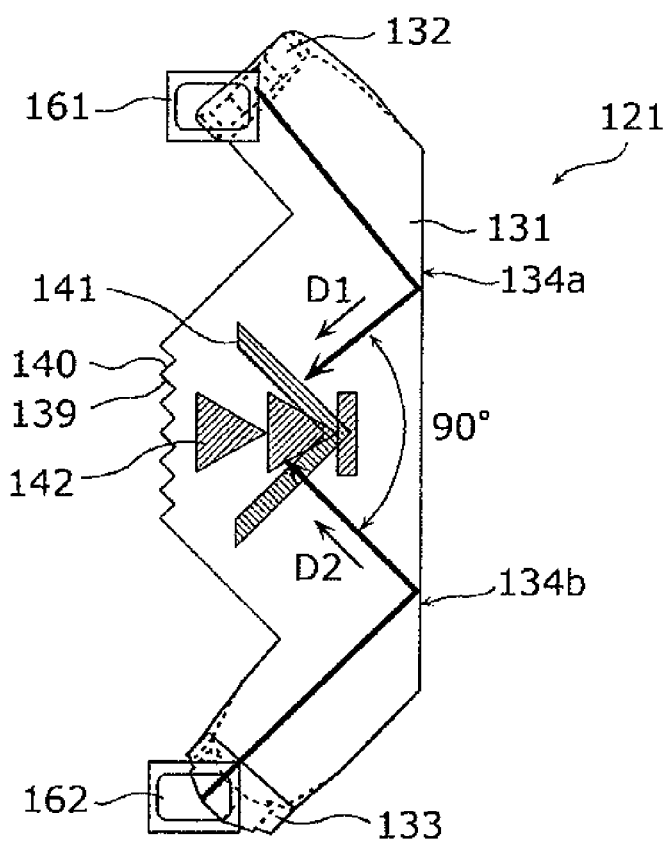
FIG. 13 is an explanatory drawing illustrating routes of lights emitted from two light sources in an output section of the first light guide body.

The first light and the second light guided by first light guide leg section 132 and second light guide leg section 133 to output section 131 then travel from output section 131 respectively toward first design 141 and second design 142. The first light and the second light entering output section 131 may generate stray light not contributing to display of first design 141 and second design 142 at output section 131 irrespective of a device for preventing or reducing stray light in first light guide leg section 132 and second light guide leg section 133. Therefore, a following configuration may be employed for preventing or reducing stray light generated at output section 131. With reference to FIG. 13 and FIG. 14, the configuration will be described.

FIG. 13 is an explanatory view illustrating a route of light emitted from two light sources 161, 162 in output section 131 of first light guide body 121. FIG. 14 is a partially enlarged view of first design 141 in output section 131.

As illustrated in FIG. 13, the first light guided by first light guide leg section 132 to output section 131 enters first design 141 in first direction D1 and the second light guided by second light guide leg section 133 to output section 131 enters second design 142 in second direction D2. First direction D1 and second direction D2 intersect each other. Specifically, first direction D1 and second direction D2 are substantially orthogonal to each other.

As illustrated in FIG. 14, first design 141 includes a plurality of inclined surfaces 141a extending in substantially parallel to second direction D2 intersecting first direction D1. Second design 142, although not illustrated, includes a plurality of inclined surfaces extending in substantially parallel to first direction D1. Accordingly, first design 141 has a configuration allowing reflection of the first light traveling in first direction D1 but resisting reflection of the second light traveling in second direction D2. Likewise, second design 142 has a configuration allowing reflection of the second light traveling in second direction D2, but resisting reflection of the first light traveling in first direction D1.

In this manner, since first direction D1 and second direction D2 intersect with each other, reflection of the first light from second design 142 or reflection of the second light from first design 141 may be reduced. In other words, slight display of unintended design due to reflection of lights not supported by first design 141 and second design 142 may be reduced.

Output section 131 also includes third stepped surfaces 139 and fourth stepped surfaces 140. Third stepped surfaces 139 are planes disposed on an extension of first direction D1 corresponding to a direction of entry of the first light into first design 141, intersecting first direction D1, and facing first direction D1, a part of third stepped surfaces 139 being opened. Fourth stepped surfaces 140 are planes disposed on an extension of second direction D2 corresponding to a direction of entry of the second light into second design 142, intersecting second direction D2, and facing second direction D2, a part of fourth stepped surfaces 140 being opened.

This configuration allows a reduction of reflection of light entered first design 141 but not reflected by first design 141 in a direction different from first direction D1 at an end of output section 131 on the negative side in X-axis direction. Likewise, this configuration also allows a reduction of reflection of light entered second design 142 but not reflected by second design 142 in a direction different from second direction D2 at an end of output section 131 on the negative side in X-axis direction. Accordingly, staying of light not involved in display of first design 141 and second design 142 in output section 131 may be reduced and display of other portion of output section 131 by being illuminated may be reduced when one of first design 141 and second design 142 is selectively displayed.

As illustrated in FIG. 12, a plurality of third stepped surfaces 139 are formed and the plurality of third stepped surfaces 139 are disposed at different position in fifth direction D5 (Y-axis direction in FIG. 12) intersecting first direction D1 and second direction D2. Likewise, a plurality of fourth stepped surfaces 140 are formed and the plurality of fourth stepped surfaces 140 are disposed at different positions in Y-axis direction in FIG. 12. The plurality of third stepped surfaces 139 and the plurality of fourth stepped surfaces 140 are arranged alternately in Y-axis direction.

In this manner, alternate arrangement of the plurality of third stepped surfaces 139 and the plurality of fourth stepped surfaces 140 in Y-axis direction allows arrangement of the plurality of third stepped surfaces 139 and the plurality of fourth stepped surfaces 140 in a limited area of output section 131. Consequently, staying of light not involved in display of first design 141 and second design 142 in output section 131 may be reduced more effectively and display of other portion by being illuminated may be reduced when one of first design 141 and second design 142 is selectively displayed.

In first light guide body 121 illustrated in FIG. 12, the plurality of third stepped surfaces 139 and the plurality of fourth stepped surfaces 140 are arranged alternately as described above. However, the same applies to third light guide body 123 as well and the stepped surfaces are arranged alternately in Y-axis direction. In contrast, the plurality of third stepped surfaces 139 and the plurality of fourth stepped surfaces 140 on second light guide body 122 and fourth light guide body 124 are arranged alternately in X-axis direction as illustrated in FIG. 11.

Third stepped surfaces 139 and fourth stepped surfaces 140 may be colored in black. Therefore, reflection of the first light and the second light from third stepped surfaces 139 and fourth stepped surfaces 140 may be reduced. Consequently, staying of light not involved in display of first design 141 and second design 142 in output section 131 may be reduced more effectively and display of other portion by being illuminated may be reduced when one of first design 141 and second design 142 is selectively displayed.

1-4. Advantageous Effects

According to input device 100 of the exemplary embodiment, as for first design 141 and second design 142 configured to emit lights by reflecting lights, first light guide leg section 132 and second light guide leg section 133 configured to guide lights to the corresponding one of first design 141 and second design 142, and light source 161 and light source 162 configured to emit light to the corresponding light guide leg sections are provided. Accordingly, by selectively causing either one of light source 161 and light source 162 to emit light, two designs, that is, first design 141 and second design 142 may be selectively displayed.

Modification

Figure 15:
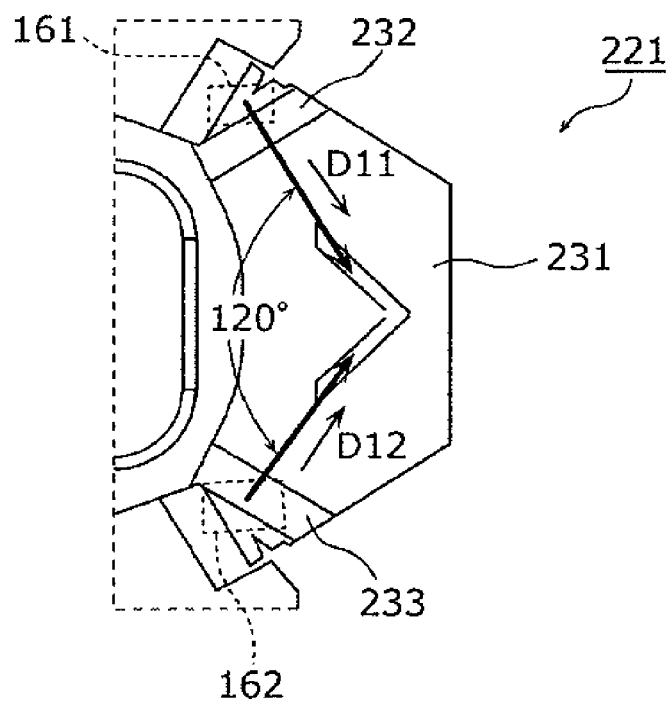
FIG. 15 is a drawing illustrating a relationship between the light guide body and two light sources according to a modification.

In the exemplary embodiment described above, output section 131 is provided with first reflecting section 134a and second reflecting section 134b configured to reflect the first light and the second light guided by first light guide leg section 132 and second light guide leg section 133 respectively to output section 131 toward the first design and the second design. However, first reflecting section 134a and second reflecting section 134b do not have to be provided on output section 131. For example, as illustrated in FIG. 15, light guide body 221 may be employed. Light guide body 221 is configured to guide the first light and the second light guided by first light guide leg section 232 and second light guide leg section 233 respectively to output section 231 toward the first design and the second design without reflection. As illustrated in FIG. 15, an angle of intersection between first direction D11 and second direction D12 may be larger than 90 degrees such as 120 degrees. First direction D11 is a direction of travel of the first light guided by output section 231 and second direction D12 is a direction of travel of the second light guided by output section 231. FIG. 15 is a view illustrating a relationship among light guide body 221 and two light sources 161, 162 according to a modification.

In the exemplary embodiment described above, two first stepped surfaces 135, 136 are each formed on first light guide leg section 132 at different positions in the third direction. However, the number of first stepped surfaces 135, 136 is not limited to two, but three or more of first stepped surfaces may be formed.

In the exemplary embodiment described above, each of first stepped surfaces 135, 136 is formed on both sides of the route of the first light traveling in third direction D3. However, the first stepped surfaces 135, 136 may be formed on one side of the route of the first light traveling in third direction D3, or may be formed to surround the route. The same applies to second stepped surfaces 137, 138.

In the exemplary embodiment, third direction D3 and fourth direction D4 are directions substantially parallel to each other in Z-axis direction and are substantially the same direction. However, third direction D3 and fourth direction D4 may be directions different from each other. In other words, although first light guide leg section 132 and second light guide leg section 133 are described to extend in the substantially parallel to each other in Z-axis direction, first light guide leg section 132 and second light guide leg section 133 may extend to intersect with each other.

While the input devices according to one or more aspects of the present disclosure have been described above based on the exemplary embodiment, the present disclosure is not limited to this exemplary embodiment. Configurations in which various variations conceived by those skilled in the art are applied to the present exemplary embodiment, and configurations established by combining components in different exemplary embodiments may also fall within the scope of one or more aspects of the present disclosure, without departing from the gist of the present disclosure.

INDUSTRIAL APPLICABILITY

The present disclosure provides an effective input device enabling selective display of two designs.

REFERENCE MARKS IN THE DRAWINGS

2: steering input device
4: automobile
6: on-vehicle equipment
8: steering wheel
12: rim
14: spoke
16: horn switch cover
18: finger
20: dashboard
100: input device
111: housing
112: first operating unit
113, 221: light guide body
114: first supporting section
115: shaft body
116: second operating unit
117: second supporting section
118: substrate
121: first light guide body
122: second light guide body
123: third light guide body
124: fourth light guide body
131, 231: output section
132, 232: first light guide leg section
132a: curved section
133, 233: second light guide leg section
133a: curved section
134: plane
134a: first reflecting section
134b: second reflecting section
135, 136: first stepped surface
137, 138: second stepped surface
139: third stepped surface
140: fourth stepped surface
141: first design
141a: inclined surface
142: second design
151 to 155: switch
161 to 164: light source
D1, D11: first direction
D2, D12: second direction
D3: third direction
D4: fourth direction
D5: fifth direction

The invention claimed is:

1. An input device comprising:
a switch;
light sources including a first light source and a second light source disposed at a position different from a position of the first light source;
a light guide body; and
a wired substrate,
wherein the light guide body includes an output section, a first light guide leg section connected to the output section, and a second light guide leg section connected to the output section,
the switch is configured to switch a state between ON and OFF by being pressed in a pressing direction and is located on a plane orthogonal to the pressing direction,
the output section is provided in an area in an opposite direction from the pressing direction with respect to the plane,
the output section includes a first design and a second design,
the light guide body guides a first light emitted from the first light source and a second light emitted from the second light source in the opposite direction,
the first light guide leg section guides the first light to the output section,
the second light guide leg section guides the second light to the output section,
the first design reflects the first light in the opposite direction,
the second design reflects the second light in the opposite direction,
the switch, the first light source, and the second light source are mounted on the wired substrate,
the first light guide leg section includes at least one first stepped surface intersecting a third direction corresponding to a direction of travel of the first light,
the second light guide leg section includes at least one second stepped surface intersecting a fourth direction corresponding to a direction of travel of the second light,
the at least one first stepped surface includes a part facing the third direction, the part being opened or colored in black, and
the at least one second stepped surface includes a part facing the fourth direction, the part being opened or colored in black.

2. The input device according to claim 1, wherein the first light enters the first design in a first direction, the second light enters the second design in a second direction, and the first direction and the second direction intersect each other.

3. The input device according to claim 1, wherein at least parts of the first design and the second design are formed to overlap with each other in the pressing direction.

4. The input device according to claim 1, wherein
the at least one first stepped surface is a plurality of the first stepped surfaces disposed at different positions in the third direction, and
the at least one second stepped surface is a plurality of the second stepped surfaces disposed at different positions in the fourth direction.

5. The input device according to claim 1, wherein
a surface area of each of the first stepped surface is smaller than a surface area of a cross-section of the first light guide leg section at a position provided with the first stepped surface taken along a plane orthogonal to the pressing direction, and a surface area of each of the second stepped surface is smaller than a surface area of a cross-section of the second light guide leg section at a position provided with the second stepped surface taken along a plane orthogonal to the pressing direction.

6. The input device according to claim 1,
wherein
the output section is a flat plate-shaped portion, and
the first light guide leg section and the second light guide leg section are connected by portions bent at a predetermined angle with respect to the output section.

7. An input device comprising:
a switch;
light sources including a first light source and a second light source disposed at a position different from a position of the first light source;
a light guide body; and
a wired substrate,
wherein the light guide body includes an output section, a first light guide leg section connected to the output section, and a second light guide leg section connected to the output section,
the switch is configured to switch a state between ON and OFF by being pressed in a pressing direction and is located on a plane orthogonal to the pressing direction,
the output section is provided in an area in an opposite direction from the pressing direction with respect to the plane,
the output section includes a first design and a second design,
the light guide body guides a first light emitted from the first light source and a second light emitted from the second light source in the opposite direction,
the first light guide leg section guides the first light to the output section,
the second light guide leg section guides the second light to the output section,
the first design reflects the first light in the opposite direction,
the second design reflects the second light in the opposite direction,
the switch, the first light source, and the second light source are mounted on the wired substrate,
the output section includes:
at least one third stepped surface disposed on an extension of a first direction corresponding to a direction of entry of the first light into the first design and intersecting the first direction; and
at least one fourth stepped surface disposed on an extension of a second direction corresponding to a direction of entry of the second light into the second design and intersecting the second direction,
the at least one third stepped surface includes a part facing the first direction, the part being opened or colored in black, and
the at least one fourth stepped surface includes a part facing the second direction, the part being opened or colored in black.

8. The input device according to claim 7, wherein
the at least one third stepped surface is a plurality of third stepped surfaces disposed at positions different in a fifth direction, the fifth direction intersecting the first direction and the second direction,
the at least one fourth stepped surface is a plurality of fourth stepped surfaces disposed at different positions in the fifth direction, and the plurality of third stepped surfaces and the plurality of fourth stepped surfaces are arranged alternately in the fifth direction.

9. The input device according to claim 7, wherein the output section is a flat plate-shaped portion, and
the first light guide leg section and the second light guide leg section are connected by portions bent at a predetermined angle with respect to the output section.

10. The input device according to claim 7, wherein the first light enters the first design in the first direction, the second light enters the second design in the second direction, and the first direction and the second direction intersect each other.

11. The input device according to claim 7, wherein at least parts of the first design and the second design are formed to overlap with each other in the pressing direction.

\* \* \* \* \*